United States Patent
Seki et al.

(10) Patent No.: US 8,194,984 B2
(45) Date of Patent: Jun. 5, 2012

(54) IMAGE PROCESSING SYSTEM THAT REMOVES NOISE CONTAINED IN IMAGE DATA

(75) Inventors: Takeshi Seki, Aichi (JP); Tomohiro Fukuoka, Aichi (JP); Kiichiro Iga, Aichi (JP); Yuji Watarai, Aichi (JP)

(73) Assignee: Fujitsu Limited, Kawasaki (JP)

( * ) Notice: Subject to any disclaimer, the term of this patent is extended or adjusted under 35 U.S.C. 154(b) by 1084 days.

(21) Appl. No.: 12/042,091

(22) Filed: Mar. 4, 2008

(65) Prior Publication Data
US 2008/0218782 A1 Sep. 11, 2008

Related U.S. Application Data (63) Continuation-in-part of application No. 11/797,554, filed on May 4, 2007, now abandoned.

(30) Foreign Application Priority Data

Mar. 5, 2007 (JP) ................................. 2007-054713

(51) Int. Cl.
G06K 9/48 (2006.01)
(52) U.S. Cl. ...................................................... 382/199
(58) Field of Classification Search .................. 382/190, 382/199, 208, 254, 275, 143, 166
See application file for complete search history.

(56) References Cited

U.S. PATENT DOCUMENTS

| 5,392,137 | A | 2/1995 | Okubo | |
|---|---|---|---|---|
| 7,542,082 | B2 * | 6/2009 | Tajima et al. | 348/246 |
| 2005/0135699 | A1 * | 6/2005 | Anderson | 382/261 |
| 2005/0254721 | A1 | 11/2005 | Hagiwara | |
| 2006/0232690 | A1 * | 10/2006 | Tamura et al. | 348/242 |
| 2011/0097010 | A1 * | 4/2011 | Wang et al. | 382/261 |

FOREIGN PATENT DOCUMENTS

| JP | 05-075850 | 3/1993 |
|---|---|---|
| JP | 5-307603 | 11/1993 |
| JP | 2002-223391 | 8/2002 |
| JP | 2003-259126 | 9/2003 |
| JP | 2004-005424 | 1/2004 |
| JP | 2004-355339 | 12/2004 |
| JP | 2005-311962 | 11/2005 |
| JP | 2005-323926 | 11/2005 |
| JP | 2006-41813 | 2/2006 |

* cited by examiner

Primary Examiner — Brian Q Le
Assistant Examiner — Edward Park
(74) Attorney, Agent, or Firm — Arent Fox LLP (57) ABSTRACT

An image processing system is disclosed that includes a buffer unit configured to store a predetermined pixel and peripheral pixels neighboring the predetermined pixel in image data in a first direction and a second direction perpendicular to the first direction; and a first edge-detecting circuit configured to calculate a maximum value and a minimum value of a set of pixels selected from the peripheral pixels that have the same color as the predetermined pixel to calculate a difference value between the maximum value and the minimum value.

15 Claims, 9 Drawing Sheets

IMAGE PROCESSING SYSTEM THAT REMOVES NOISE CONTAINED IN IMAGE DATA

CROSS-REFERENCES TO RELATED APPLICATIONS

This application is a continuation-in-part application Ser. No. 11/797554, filed on May 4, 2007, which claims the benefit of priority of Japanese Patent Application No. 2007-054713 filed on Mar. 5, 2007, the entire contents of which are incorporated herein by reference.

BACKGROUND OF THE INVENTION

1. Field of the Invention

This application generally relates to image processing system.

2. Description of the Related Art

Figure 1:
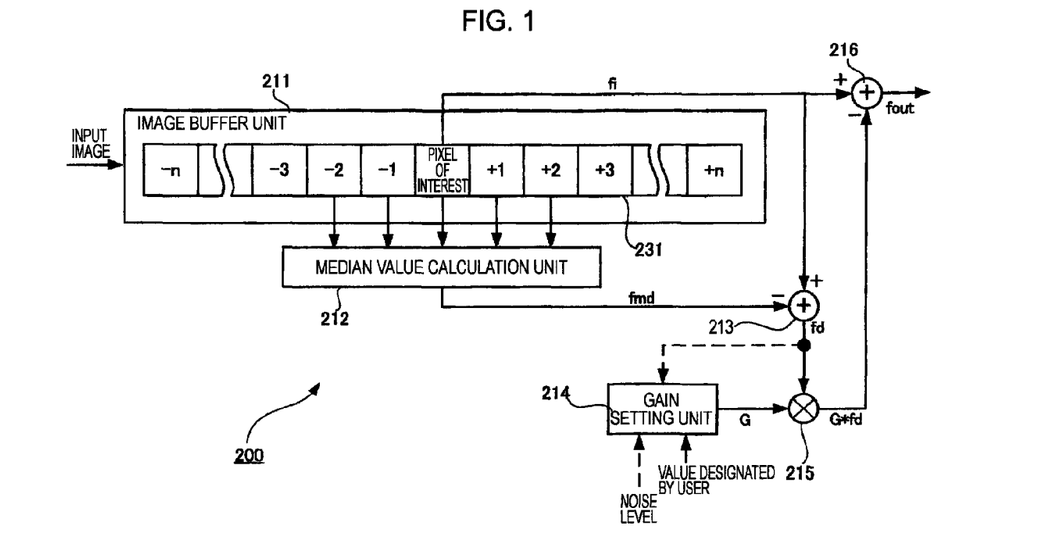
FIG. 1 is a block diagram showing an image processing apparatus.

An image processing apparatus that removes noise contained in image data is disclosed, for example, in Japanese Laid-open Patent Publication No. 2003-259126, as shown in FIG. 1.

An image processing apparatus 200 described in Japanese Laid-open Patent Publication No. 2003-259126 includes a median value calculation unit 212 that calculates a median value of a target pixel in an image block 231 and neighboring pixels of the target pixel (−2, −1, +1, +2). The image processing apparatus 200 also includes a subtracter 213 that calculates a difference value fd by subtracting a median value fmd from a value fi of the target pixel. The image processing apparatus 200 also includes a multiplier 215 that calculates a correction value (G*fd) by multiplying the difference value fd by a gain G set by a gain setting unit 214, and a subtracter 216 that subtracts the correction value (G*fd) from the value fi of the target pixel and outputs the obtained value fout.

By setting the gain G on the basis of the difference value fd, noise contained in image data can be appropriately removed.

Other examples of the related art include Japanese Laid-open Patent Publications No. 2004-355339, No. 2005-323926, No. 2006-041813, and No. 5-307603.

SUMMARY OF THE INVENTION

According to an aspect of one embodiment, an image processing system can include a buffer unit configured to store a predetermined pixel and peripheral pixels neighboring the predetermined pixel in image data in a first direction and a second direction perpendicular to the first direction; and a first edge-detecting circuit configured to calculate a maximum value and a minimum value of a set of pixels selected from the peripheral pixels that have the same color as the predetermined pixel to calculate a difference value between the maximum value and the minimum value.

Additional advantages and novel features of the invention will be set forth in part in the description that follows, and in part will become more apparent to those skilled in the art upon examination of the following or upon learning by practice of the invention.

DETAILED DESCRIPTION OF EMBODIMENTS

Some charge-coupled devices (CCDs) used for digital cameras, or the like, output Bayer pattern image data. Apparatuses using such CCDs convert Bayer pattern image data into RGB image data and/or YUV image data, and perform image processing, such as noise removal, for the converted RGB and/or YUV image data.

However, in the process for converting Bayer pattern image data into RGB image data and/or YUV image data, noise components are created and distributed within the image data. Thus, the distributed noise components can affect pixels of image data not containing noise, resulting in deterioration of the accuracy of image processing, such as noise removal. In addition, because an image conversion circuit is necessary for converting Bayer pattern image data into RGB image data and/or YUV image data, the image processing apparatus typically has an increased circuit scale.

Figure 2:
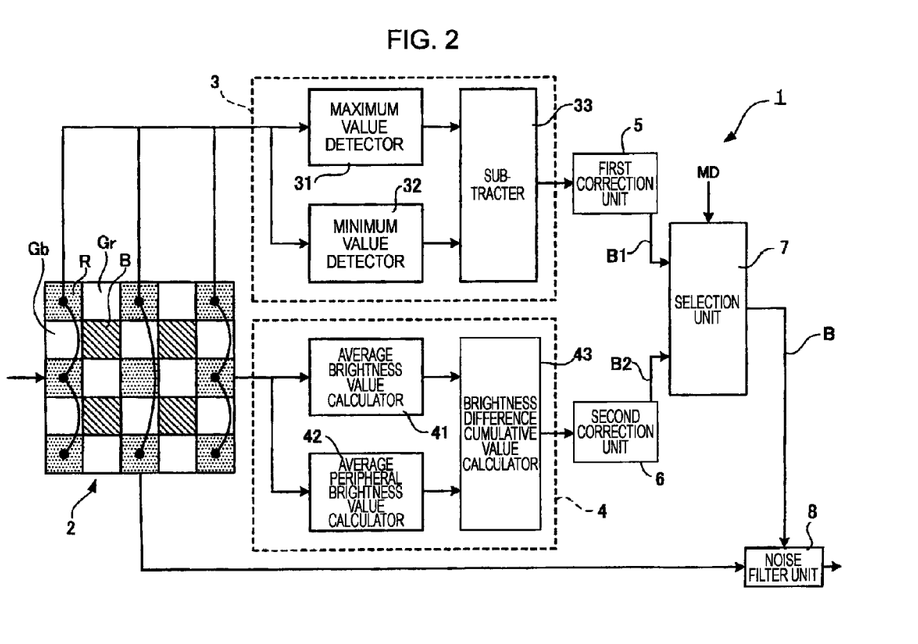
FIG. 2 is a circuit block diagram showing various features in accordance with a first embodiment.

FIG. 2 is a circuit block diagram showing various features in accordance with a first embodiment.

An image processing apparatus 1 receives Bayer pattern image data, in which an R pixel, a Gr pixel, a Gb pixel, and a B pixel are arranged in a pixel area of 2×2 pixels. The image processing apparatus 1 detects whether a pixel area of 5×5 pixels is a smooth area or an edge area. In accordance with the result of the detection, the image processing apparatus 1 appropriately performs filter processing for a target pixel oo disposed at the center of the pixel area of 5×5 pixels.

In the following description, regarding the pixels in the pixel area of 5×5 pixels, the initial pixel is denoted by a pixel nn. In addition, the other pixels are denoted by pixels mn, on, pn, qn, nm, mm, om, pm, qm, no, mo, oo, po, qo, np, mp, op, pp, qp, nq, mq, oq, pq, and qq in a horizontal storage order, as shown in FIG. 2.

The image processing apparatus 1 includes a buffer unit 2 that stores a pixel area of 5×5 pixels, a first edge-detecting unit 3, a first correction unit 5 that corrects a result obtained by the first edge-detecting unit 3, a second edge-detecting unit 4, and a second correction unit 6 that corrects a result obtained by the second edge-detecting unit 4. The image processing apparatus 1 also includes a selection unit 7 that selects one of an output of the first correction unit 5 and an output of the second correction unit 6 or that combines an output of the first correction unit 5 and an output of the second correction unit 6, and a noise filter unit 8 that performs filter processing of the target pixel oo with respect to the pixels in the pixel area of 5×5 pixels and that optimizes a filter characteristic in accordance with output from the selection unit 7.

Figure 3:
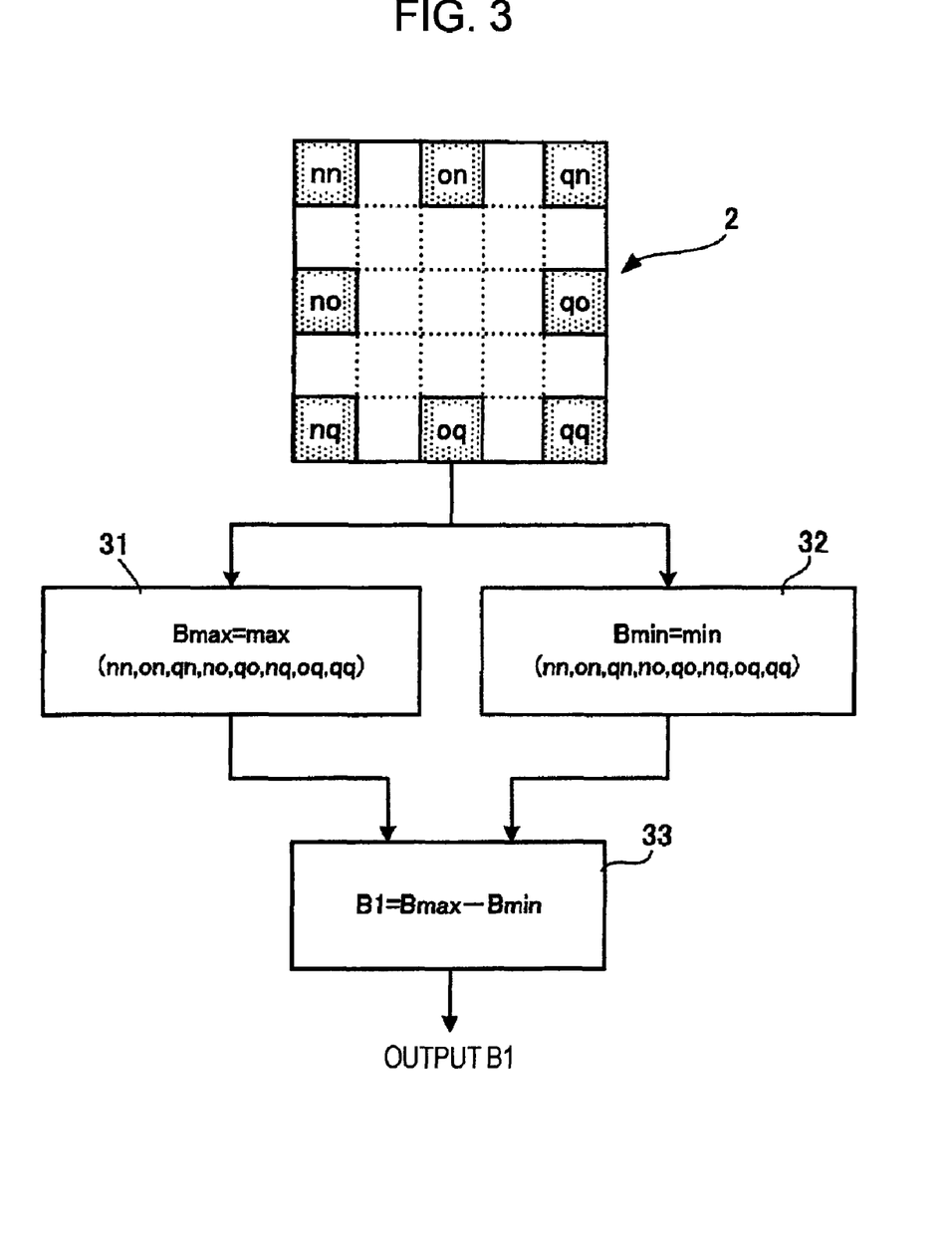
FIG. 3 is a functional block diagram showing various features of a first edge-detecting unit in accordance with the embodiment of FIG. 2.

FIG. 3 is a functional block diagram showing various features of the first edge-detecting unit 3 of FIG. 2.

A maximum value detector 31 acquires pixels nn, on, qn, no, qo, nq, oq, and qq, which have the same color as the target pixel oo, from among peripheral pixels, and detects the maximum value Bmax from among the values of the acquired pixels.

A minimum value detector 32 acquires the pixels nn, on, qn, no, qo, nq, oq, and qq, which have the same color as the target pixel oo, from among the peripheral pixels, and detects the minimum value Bmin from among the values of the acquired pixels.

A subtracter 33 outputs a result obtained by subtracting the minimum value Bmin from the maximum value Bmax as a difference value B1 between the maximum value and the minimum value.

For example, when the peripheral pixels represent a smooth area, the difference between the maximum value Bmax and the minimum value Bmin is small. Thus, the difference value B1 between the maximum value and the minimum value is small. In contrast, when the peripheral pixels represent an edge area, the difference between the maximum value Bmax and the minimum value Bmin is large. Thus, the difference value B1 between the maximum value and the minimum value is large.

In the buffer unit 2, the target pixel is disposed at the center of the peripheral pixels, and the peripheral pixels are arranged such that the number of peripheral pixels disposed in the horizontal direction is equal to the number of peripheral pixels disposed in the vertical direction, as shown in FIG. 3. With this arrangement, pixels can be equally extracted from image data in the horizontal direction and in the vertical direction, as shown in FIG. 3. Pixels that have the same color as the target pixel are disposed in an outermost region of the peripheral pixels. Thus, pixels having the three primary colors can be efficiently extracted. In addition, the peripheral pixels represent Bayer pattern image data. The buffer unit 2 stores pixels arranged in five rows and five columns of image data, as shown in FIG. 3, so as to be centered on the pixel of interest. Thus, in the first embodiment, a group of peripheral pixels, including pixels having the three primary colors, can be formed as the smallest appropriate unit.

Referring back to FIG. 2, the first correction unit 5 performs correction, such that the value of an output of the first edge-detecting unit 3 falls within a predetermined range. The correction performed by the first correction unit 5 includes processing for setting the value of an output of the first edge-detecting unit 3 to 0 when the value of the output of the first edge-detecting unit 3 is below a predetermined lower limit, processing for setting the value of an output of the first edge-detecting unit 3 to the maximum value when the value of the output of the first edge-detecting unit 3 exceeds a predetermined upper limit, and the like.

Similarly to the detection performed by the first edge-detecting unit 3, the second edge-detecting unit 4 also detects whether the peripheral pixels represent a smooth area or an edge area. The second edge-detecting unit 4 includes an average brightness value calculator 41, an average peripheral brightness value calculator 42, and a brightness difference cumulative value calculator 43.

Figure 4:
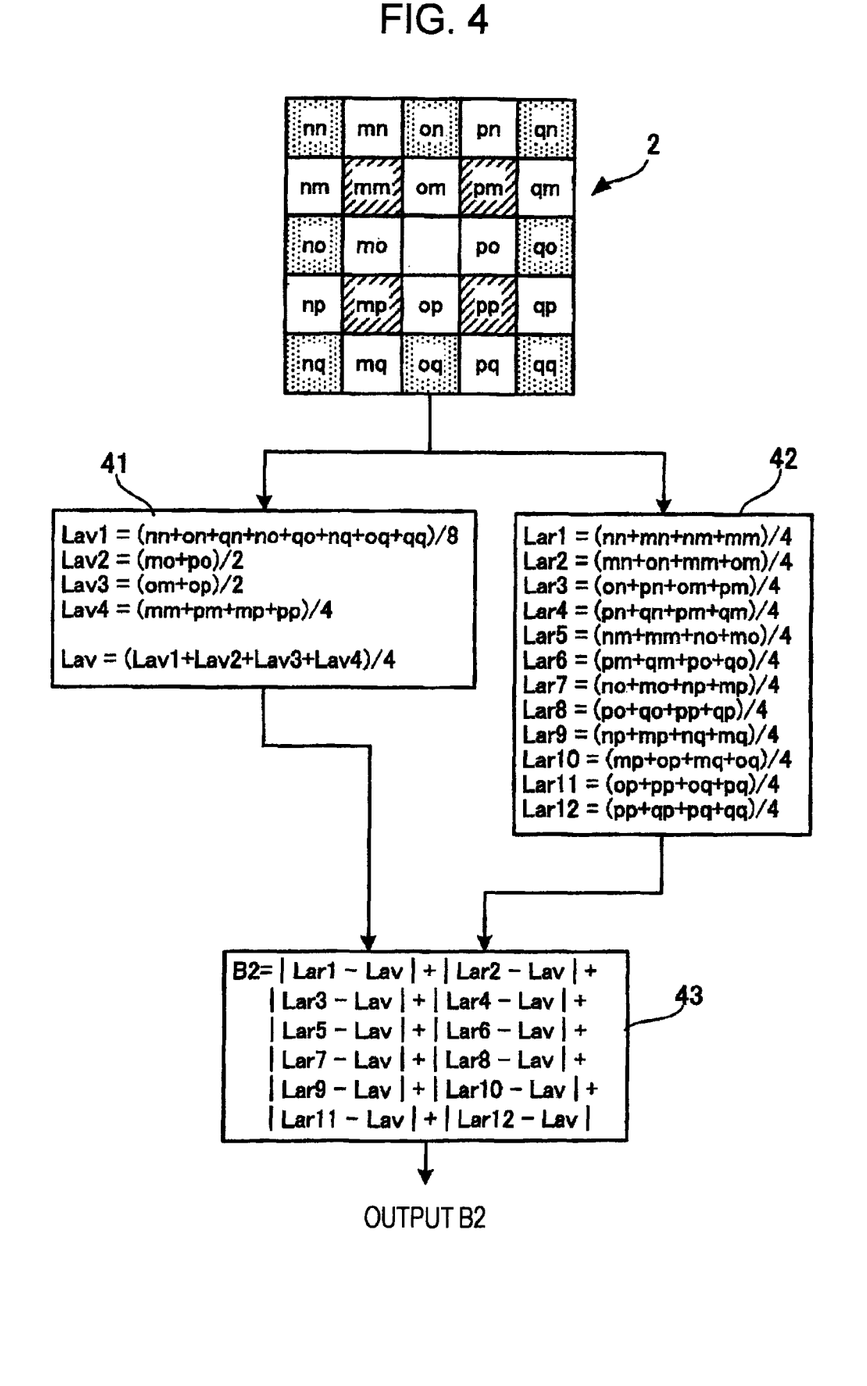
FIG. 4 is a functional block diagram showing various features of a second edge-detecting unit in accordance with the embodiment of FIG. 2.

FIG. 4 is a functional block diagram showing various features of the second edge-detecting unit 4 of FIG. 2.

The average brightness value calculator 41 acquires an average value of pixels among the peripheral pixels that have the same color, and obtains the sum of average values of peripheral pixels having the same colors. The average brightness value calculator 41 divides the sum by the number of colors, such as four, and obtains an average brightness value Lav, which is the average value of the peripheral pixels. An arithmetic operation performed by the average brightness value calculator 41 is described below.

For example, as the average value of the R pixels, an average value Lav1 is obtained by dividing the sum of the values of the pixels nn, on, qn, no, qo, nq, oq, and qq by eight. As the average value of the Gr pixels, an average value Lav2 is obtained by dividing the sum of the values of the pixels mo and po by two. As the average value of the Gb pixels, an average value Lav3 is obtained by dividing the sum of the values of the pixels om and op by two. As the average value of the B pixels, an average value Lav4 is obtained by dividing the sum of the values of the pixels mm, pm, mp, and pp by four. Then, the average brightness value Lav is obtained by dividing the sum of the average values Lav1, Lav2, Lav3, and Lav4 by four.

In the first embodiment, the average value of the Gr pixels is obtained by dividing the sum of the values of the pixels mo and po by two. However, the average value Lav2 may be obtained by adding the values of the pixels mn, pn, mp, and pq, which are also Gr pixels among the peripheral pixels, to the sum of the values of the pixels mo and po and by dividing the sum of the values of the pixels mo, po, mn, pn, mp, and pq by six. In addition, in the first embodiment, the average value of the Gb pixels is obtained by dividing the sum of the values of the pixels om and op by two. However, the average Lav3 may be obtained by adding the values of the pixels nm, qm, np, and qp, which are also Gr pixels among the peripheral pixels, to the sum of the values of the pixels om and op and by dividing the sum of the values of the pixels om, op, nm, qm, np, and qp by six.

The average peripheral brightness value calculator 42 acquires a combination of pixels having the three primary colors from among the peripheral pixels. The average peripheral brightness value calculator 42 obtains, for each combination of pixels, an average peripheral brightness value Lar, which is the average value of the combination of pixels. In the first embodiment, image data includes 5×5 pixels, and a combination of pixels having the three primary colors includes an R pixel, a Gr pixel, a Gb pixel, and a B pixel.

In this case, twelve combinations of R pixels, Gr pixels, Gb pixels, and B pixels among the peripheral pixels are available. That is, a combination of pixels nn, mn, nm, and mm, a combination of pixels mn, on, mm, and om, a combination of pixels on, pn, om, and pm, a combination of pixels pn, qn, pm, and qm, a combination of pixels nm, mm, no, and mo, a combination of pixels pm, qm, po, and qo, a combination of pixels no, mo, np, and mp, a combination of pixels po, qo, pp, and qp, a combination of pixels np, mp, nq, and mq, a combination of pixels mp, op, mq, and oq, a combination of pixels op, pp, oq, and pq, and a combination of pixels pp, qp, pq, and qq are available. The average peripheral brightness value calculator 42 calculates the average value of pixels for each of the combinations, and obtains average peripheral brightness values Lar1 to Lar12.

The brightness difference cumulative value calculator 43 obtains a brightness difference cumulative value B2, which is the sum of the absolute values obtained by subtracting the average brightness value Lav from a corresponding average peripheral brightness value Lar. The image processing apparatus 1 according to the first embodiment calculates the sum of absolute values |Lar1−Lav|, |Lar2−Lav|, |Lar3−Lav|, |Lar4−Lav|, |Lar5−Lav|, |Lar6−Lav|, |Lar7−Lav|, |Lar8−Lav|, |Lar9−Lav|, |Lar10−Lav|, |Lar11−Lav|, and |Lar12−Lav|, and obtains the brightness difference cumulative value B2.

For example, when the peripheral pixels represent a smooth area, the difference between the average brightness value Lav of the peripheral pixels and each of the average peripheral brightness values Lar is small. Thus, the brightness difference cumulative value B2 is small. In contrast, when the peripheral pixels represent an edge area, the difference between the average brightness value Lav of the peripheral pixels and each of the average peripheral brightness values Lar is large. Thus, the brightness difference cumulative value B2 is large.

In the first embodiment, by calculating the sum of the absolute values obtained by subtracting the average brightness value from a corresponding average peripheral brightness value, a value for detecting whether image data represents a smooth area exhibiting a smooth pixel change or the image data represents an edge area exhibiting a significant pixel change can be obtained.

In the buffer unit 2, the target pixel is disposed at the center of the peripheral pixels, as shown in FIG. 4, and the peripheral pixels are arranged such that the number of peripheral pixels disposed in the horizontal direction is equal to the number of peripheral pixels disposed in the vertical direction. With this arrangement, pixels can be equally extracted from image data in the horizontal direction and in the vertical direction. Pixels that have the same color as the target pixel are disposed in an outermost region of the peripheral pixels. Thus, pixels having the three primary colors can be efficiently extracted. In addition, the peripheral pixels represent Bayer pattern image data. The buffer unit 2 stores pixels arranged in five rows and five columns of image data, as shown in FIG. 4, so as to be centered on the target pixel. Thus, a group of peripheral pixels, including pixels having the three primary colors, can be formed as the smallest appropriate unit.

Referring back to FIG. 2, the second correction unit 6 performs correction, such that the value of an output of the second edge-detecting unit 4 falls within a predetermined range. The correction performed by the second correction unit 6 includes processing for setting the value of an output of the second edge-detecting unit 4 to 0 when the value of the output of the second edge-detecting unit 4 is below a predetermined lower limit, processing for setting the value of an output of the second edge-detecting unit 4 to the maximum value when the value of the output of the second edge-detecting unit 4 exceeds a predetermined upper limit, and the like.

The selection unit 7 selects, in accordance with a mode signal MD, one of the value of an output of the first correction unit 5 and the value of an output of the second correction unit 6, and outputs the selected value as a correction value B. The selection unit 7 may output, as the correction value B, a larger one of the value of the output of the first correction unit 5 and the value of the output of the second correction unit 6, or a smaller one of the value of the output of the first correction unit 5 and the value of the output of the second correction unit 6, in accordance with the mode signal MD.

The noise filter unit 8 performs noise removal processing for image data using a median filter, and outputs the processed value of the target pixel oo. The noise filter unit 8 includes the median filter and a target pixel calculator that combines the value of the target pixel oo of the image data with the value of the target pixel oo obtained from the median filter on a pro-rata basis corresponding to the correction value B.

Thus, an output characteristic of the noise filter unit 8 is changed in accordance with the correction value B supplied from the selection unit 7. More specifically, the noise filter unit 8 combines the value of the target pixel oo of the image data with the value of the target pixel oo output from the median filter on a pro-rata basis corresponding to the correction value B, and outputs the combined value. For example, when the correction value B is small, the proportion of the value of the target pixel oo output from the median filter to the value of the target pixel oo of the image data is large. Thus, the noise removal characteristic is more effective. In contrast, when the correction value B is large, the proportion of the value of the target pixel oo of the image data to the value of the target pixel oo output from the median filter is large. Thus, the noise removal characteristic is less effective.

In the first embodiment, the noise filter unit 8 varies the proportion of the value of the target pixel oo of the image data to the value of the target pixel oo output from the median filter, in accordance with the correction value B. However, the noise filter unit 8 may include a comparator that compares the correction value B with a threshold value BTH, and a target pixel selector that selects one of the value of the target pixel oo output from the median filter and the value of the target pixel oo of the image data. The target pixel selector outputs the value of the target pixel oo from the median filter when the correction value B is less than the threshold value BTH, and outputs the value of the target pixel oo of the image data when the correction value B is equal to or more than the threshold value BTH. With this configuration, a more simplified circuit configuration can be achieved compared with a case where a circuit configuration includes the above-described target pixel calculator.

The following is a description of operation of the image processing apparatus 1 according to the first embodiment.

A case where image data of 5×5 pixels represents a smooth area will be considered for this example. Because the difference obtained by the first edge-detecting unit 3 between the maximum value Bmax and the minimum value Bmin of pixels among the peripheral pixels that have the same color as the target pixel oo is small, the difference value B1 between the maximum value and the minimum value is small. Similarly, since the difference obtained by the second edge-detecting unit 4 between the average brightness value Lav of the peripheral pixels and each of the average peripheral brightness values Lar is small, the brightness difference cumulative value B2 is small.

Thus, the correction value B output from the selection unit 7 is small, irrespective of whether the selection unit 7 selects the difference value B1 between the maximum value and the minimum value or the brightness difference cumulative value B2.

The noise filter unit 8 makes the noise removal characteristic more effective when the correction value B is small. Thus, a value from which noise has been significantly removed is output from the noise filter unit 8.

That is, when the image data represents a smooth area, a value from which noise has been significantly removed is output as the value of the target pixel oo. Thus, in a case where the image data represents a smooth area, even when the target pixel oo contains noise, the noise is prevented from being prevalent.

In a case where a pixel among the peripheral pixels contains noise at a level significantly higher than the level of noise contained in the other pixels among the peripheral pixels, even when the peripheral pixels represent a smooth area, the difference value B1 between the maximum value and the minimum value may be large. In contrast, since the brightness difference cumulative value B2 is obtained by calculating an average value for each combination of the R pixel, the Gr pixel, the Gb pixel, and the B pixel of the peripheral pixels, even when such noise having a high level is contained in a pixel among the peripheral pixels, the peak value of noise can be reduced. Thus, the brightness difference cumulative value B2 is smaller than the difference value B1 between the maximum value and the minimum value, and reflects the condition of the image data more appropriately. That is, the second edge-detecting unit 4 is capable of outputting a correction value for the noise filter unit 8 with a higher accuracy compared with a correction value output from the first edge-detecting unit 3.

A case where image data of 5×5 pixels represents an edge area will next be considered. Since the difference obtained by the first edge-detecting unit 3 between the maximum value Bmax and the minimum value Bmin of pixels among the peripheral pixels that have the same color as the target pixel oo is large, the difference value B1 between the maximum value and the minimum value is large. Similarly, since the difference obtained by the second edge-detecting unit 4 between the average brightness value Lav of the peripheral pixels and each of the average peripheral brightness values Lar is large, the brightness difference cumulative value B2 is large.

Thus, the correction value B output from the selection unit 7 is large, irrespective of whether the selection unit 7 selects the difference value B1 between the maximum value and the minimum value or the brightness difference cumulative value B2.

The noise filter unit 8 makes the noise removal characteristic less effective when the correction value B is large. Thus, a value from which noise has been slightly removed is output from the noise filter unit 8.

That is, when image data represents an edge area, a value from which noise has been slightly removed is output as the value of the target pixel oo. That is, when image data represents an edge area, peripheral pixels change greatly. Thus, when the target pixel oo contains noise, even if the noise is not removed, the noise is not prevalent. Actually, when image data represents an edge area, removing noise causes a blurred edge. Thus, by removing noise only minimally, an edge is prevented from being blurred.

As described above, the image processing apparatus 1 according to the first embodiment is capable of appropriately performing noise removal for a target pixel oo by determining whether peripheral pixels represent a smooth area or an edge area. In addition, the image processing apparatus 1 according to the first embodiment directly performs determination of an area of Bayer pattern image data, and directly performs noise removal processing for the Bayer pattern image data. Thus, compared with a configuration in which noise removal is performed after Bayer pattern image data is converted into RGB image data and/or YUV image data, the image processing apparatus 1 according to the first embodiment is capable of performing noise removal more accurately, without being affected by the peripheral pixels. In addition, since the image processing apparatus 1 does not need a circuit for converting Bayer pattern image data into RGB image data and/or YUV image data, a smaller circuit scale can be achieved compared with an apparatus including a conversion circuit.

Figure 5:
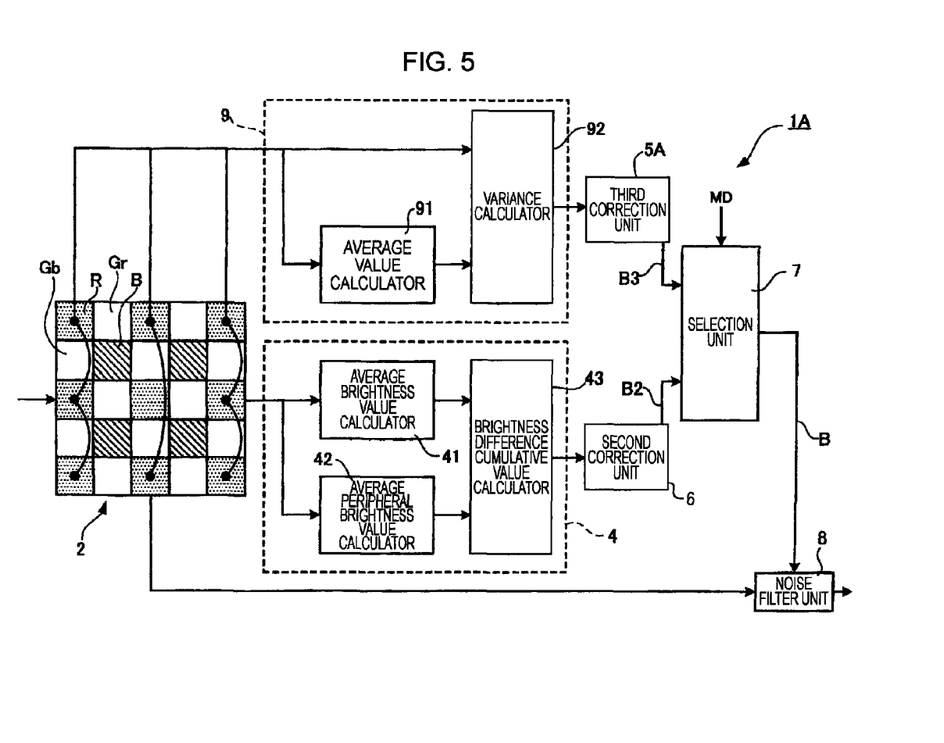
FIG. 5 is a circuit block diagram showing various features in accordance with a second embodiment.

FIG. 5 is a circuit block diagram of an image processing apparatus 1A showing various features in accordance with a second embodiment. The image processing apparatus 1A according to the second embodiment is different from the image processing apparatus 1 according to the first embodiment, in that, for example, the image processing apparatus 1A includes a third edge-detecting unit 9, instead of the first edge-detecting unit 3. Thus, only the third edge-detecting unit 9 is described, and the description of the same parts as in the first embodiment is omitted or simplified.

Figure 6:
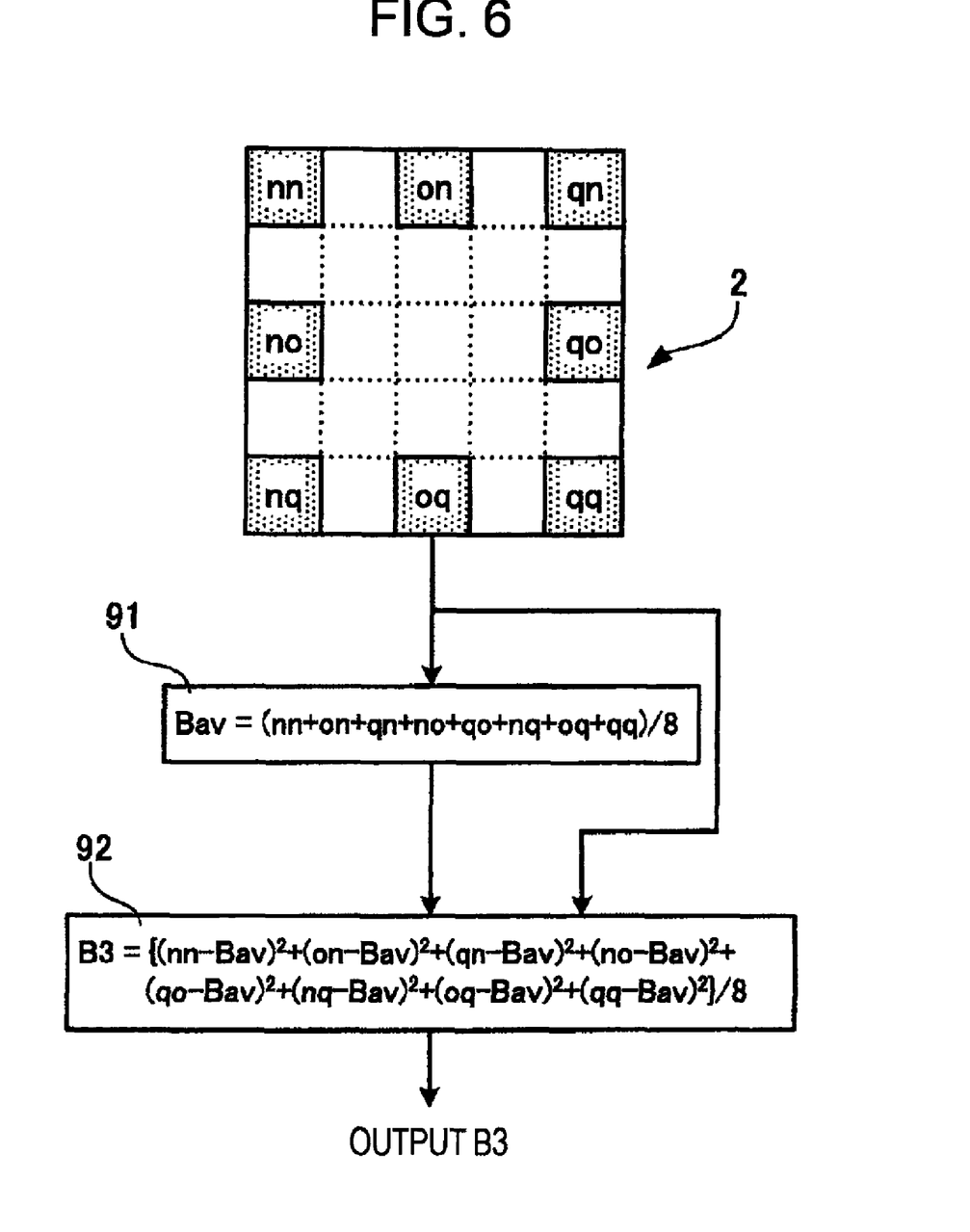
FIG. 6 is a functional block diagram showing various features of a third edge-detecting unit in accordance with the embodiment of FIG. 5.

As shown in FIG. 6, the third edge-detecting unit 9 includes an average value calculator 91 and a variance calculator 92.

The average value calculator 91 acquires the values of the pixels nn, on, qn, no, qo, nq, oq, and qq, which have the same color as the target pixel oo, from among the peripheral pixels, and calculates an average value Bav by dividing the sum of the values of the pixels nn, on, qn, no, qo, nq, oq, and qq by eight.

The variance calculator 92 obtains the difference between each of the values of the pixels among the peripheral pixels that have the same color as the target pixel oo and the average value Bav obtained by the average value calculator 91, and outputs a value obtained by dividing the sum of squared differences by eight as a variance B3.

For example, when the peripheral pixels represent a smooth area, the difference between the average value Bav and each of the values of the pixels nn, on, qn, no, qo, nq, oq, and qq is small. Thus, the variance B3 is small. In contrast, when the peripheral pixels represent an edge area, the difference between the average value Bav and each of the values of the pixels nn, on, qn, no, qo, nq, oq, and qq is large. Thus, the variance B3 is large.

The image processing apparatus 1A according to the second embodiment has an advantage similar to that of the image processing apparatus of the first embodiment. That is, the image processing apparatus 1A according to the second embodiment is capable of appropriately performing noise removal for the target pixel oo by determining whether the peripheral pixels represent a smooth area or an edge area. In addition, the image processing apparatus 1A according to the second embodiment directly performs determination of an area of Bayer pattern image data and directly performs noise removal processing for the Bayer pattern image data. Thus, compared with a configuration in which noise removal is performed after Bayer pattern image data is converted into RGB image data and/or YUV image data, the image processing apparatus 1A according to the second embodiment is capable of performing noise removal more accurately, without being affected by the peripheral pixels. In addition, since the image processing apparatus 1A does not need a circuit for converting Bayer pattern image data into RGB image data and/or YUV image data, a smaller circuit scale can be achieved compared with an apparatus including a conversion circuit.

In the buffer unit 2, the target pixel is disposed at the center of the peripheral pixels, and the peripheral pixels are arranged such that the number of peripheral pixels disposed in the horizontal direction is equal to the number of peripheral pixels disposed in the vertical direction, as shown in FIG. 5. Thus, pixels can be equally extracted from image data in the horizontal direction and in the vertical direction. Pixels that have the same color as the target pixel are disposed in an outermost region of the peripheral pixels. With this arrangement, pixels having the three primary colors can be efficiently extracted. In addition, the peripheral pixels represent Bayer pattern image data. The buffer unit 2 stores pixels arranged in five rows and five columns of image data, so as to be centered on the pixel of interest. Thus, a group of peripheral pixels including pixels having the three primary colors can be formed as the smallest appropriate unit.

The first edge-detecting unit 3 of the image processing apparatus 3 according to the first embodiment of FIG. 1 detects the condition of an area of image data in accordance with a difference between the maximum value Bmax and the minimum value Bmin of the values of the pixels nn, on, qn, no, qo, nq, oq, and qq among the peripheral pixels that have the same color as the target pixel oo. Thus, when noise is contained in even one of the pixels nn, on, qn, no, qo, nq, oq, and qq, the first edge-detecting unit 3 of FIG. 1 performs false detection. In contrast, as shown in FIG. 5, the third edge-detecting unit 9 of the image processing apparatus 1A according to the second embodiment detects the condition of an area of image data in accordance with the variance B3 of the values of the pixels nn, on, qn, no, qo, nq, oq, and qq. Thus, even when noise is contained in one of the pixels nn, on, qn, no, qo, nq, oq, and qq, the influence of noise is distributed within the image data, thus suppressing false detection.

Figure 7:
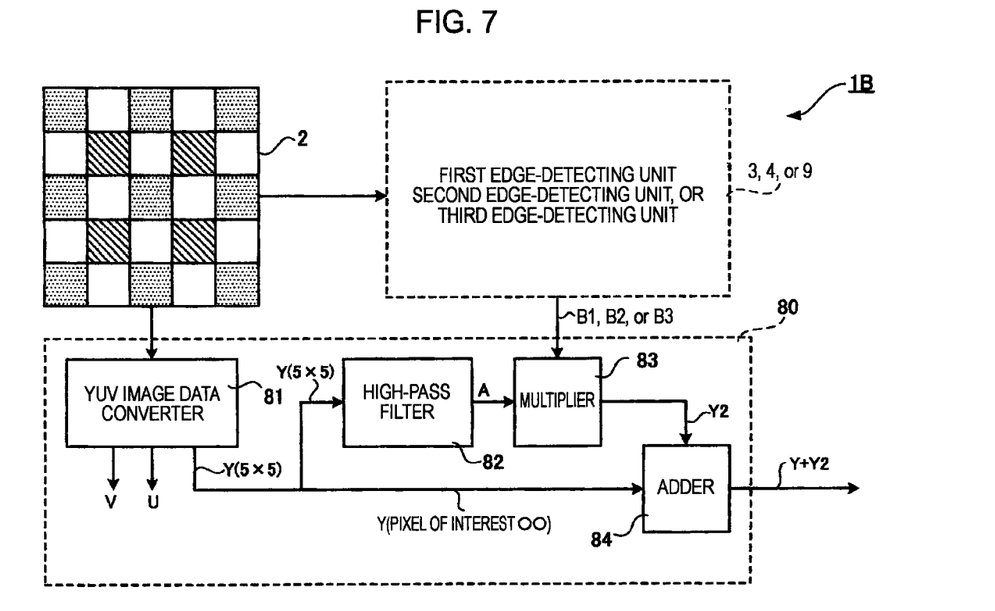
FIG. 7 is a circuit block diagram showing various features in accordance with a third embodiment.

FIG. 7 is a circuit block diagram of an image processing apparatus 1B showing various features in accordance with a third embodiment. The image processing apparatus 1B according to the third embodiment differs from the image processing apparatus of the first embodiment, in that the image processing apparatus 1B includes an edge-enhancement unit 80 instead of the noise filter unit 8 (FIG.) 2, and in that, for example, the image processing apparatus 1B does not include the brightness difference cumulative value calculator 43 (FIG. 4) and the selection unit 7 (FIG. 2). Thus, only the edge-enhancement unit 80 is described, and the description of the same parts as in the first embodiment is omitted or simplified.

The edge-enhancement unit 80 includes a YUV image data converter 81, a high-pass filter 82, a multiplier 83, and an adder 84.

The YUV image data converter 81 receives Bayer pattern image data of 5×5 pixels stored in the buffer unit 2, and converts the Bayer pattern image data of 5×5 pixels into YUV image data of 5×5 pixels. YUV image data is image data including a luminance signal Y, a differential signal U, indicating a difference between the luminance signal Y and a blue component, and a differential signal V, indicating a difference between the luminance signal Y and a red component. The YUV image data converter 81 converts the Bayer pattern image data stored in the buffer unit 2 into RGB image data (that is, image data including a red signal R, a green signal G, and a blue signal B) using a bilinear method, and then into YUV image data, in accordance with a different method.

The high-pass filter 82 receives luminance signals Y of 5×5 pixels of the YUV image data of 5×5 pixels output from the YUV image data converter 81. The high-pass filter 82 performs high-pass filtering in which high-frequency components of spatial frequencies of the luminance signals Y of 5×5 pixels are enhanced, and outputs a high-emphasis pixel value A at the position of the target pixel oo. High-pass filtering includes a method of using a weight matrix of 5×5 pixels. The weight matrix can be set in a desired manner by a central processing unit (CPU) or the like, which is not shown in FIG. 7.

The multiplier 83 multiplies the high-emphasis pixel value A output from the high-pass filter 82 by the difference value B1 between the maximum value and the minimum value output from the first edge-detecting unit 3, and outputs the product as a luminance correction value Y2. The difference value B1 between the maximum value and the minimum value is normalized in advance, such that the minimum difference value B1 is 0 and the maximum difference value B1 is 1. That is, for a smooth area, as a change of image data is smaller, the difference value B1 is closer to 0. In contrast, for an edge area, as a change of image data is greater, the difference value B1 is closer to 1. With this multiplication, the luminance correction value Y2 is approximately 0 when the image data represents a smooth area, and the luminance correction value Y2 is in the vicinity of the high-emphasis pixel value A when the image data represents an edge area.

The adder 84 adds the luminance correction value Y2 and the luminance signal Y at the position of the target pixel oo, and outputs the sum as a luminance signal Y+Y2.

The image processing apparatus 1B according to the third embodiment is capable of appropriately performing edge enhancement for the target pixel oo by determining whether the peripheral pixels represent a smooth area or an edge area. The image processing apparatus 1B according to the third embodiment directly performs determination of an area of Bayer pattern image data. Thus, compared with a configuration in which determination of an area of image data is performed after Bayer pattern image data is converted into RGB image data and/or YUV image data, edge enhancement can be achieved more accurately without being affected by the peripheral pixels.

In the third embodiment, the first edge-detecting unit 3 is used as a means for performing edge detection. However, the second edge-detecting unit 4 or the third edge-detecting unit 9 may also be used for performing edge detection. In this case, similarly, determination of an area of Bayer pattern image data is directly performed. Thus, compared with a configuration in which determination of an area of image data is performed after Bayer pattern image data is converted into RGB image data and/or YUV image data, edge enhancement can be achieved more accurately without being affected by the peripheral pixels.

In general, as a pixel value output from an image sensor, such as a charge-coupled device (CCD) sensor or a complementary metal-oxide semiconductor (CMOS) sensor, used for digital still cameras (DSCs) is greater, the magnitude of the noise included in the image data is greater. Thus, when the adaptive noise reduction processing described in the first to third embodiments is performed for image data obtained from an image sensor, a large standard deviation is obtained in an area in which output pixel values are large. Thus, the area in which output pixel values are large is likely to be regarded as an edge area. As a result, strong noise reduction is less likely to be achieved in the area.

Typical noise contained in an output pixel value obtained from an image sensor includes dark-current noise, thermal noise, shot noise, and the like. The dark-current noise is generated by a defect of crystal forming the image sensor and is pattern noise having a fixed value. The thermal noise is generated by the channel resistance of a transistor and is random noise that increases in proportion to the square root of temperature. The shot noise is caused by quantum fluctuation of an electron stored in a photodiode forming a pixel of the image sensor and is random noise, having a size proportional to the square root of a stored electric charge, that is, the square root of an output pixel value.

The dark-current noise is pattern noise having a fixed value. The thermal noise is noise in which the standard deviation of output pixel values is constant at a constant temperature. Thus, for the dark-current noise and the thermal noise, an edge detection result E obtained from portions of an image sensor that have the same color depends on shot noise. That is, the edge detection result E is represented by a function that depends on the square root of an output pixel value, as shown by equation (1):

$$E = E = d \cdot P^{1/2} \tag{1},$$

where "E" represents a pixel value of an edge detection result, "P" represents an average pixel value indicating the average value of the peripheral pixels other than the maximum value and the minimum value, and "d" represents a constant.

Figure 8:
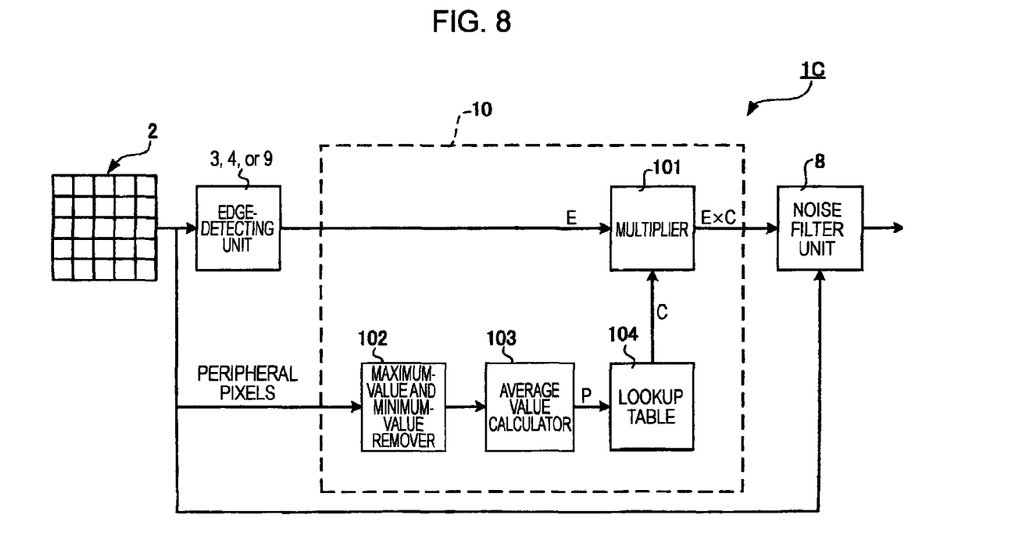
FIG. 8 is a circuit block diagram showing various features in accordance with a fourth embodiment.

FIG. 8 is a circuit block diagram of an image processing apparatus 1C showing various features in accordance with a fourth embodiment. The image processing apparatus 1C includes the buffer unit 2, the edge detecting unit, which may be the first edge-detecting unit 3, the second edge-detecting unit 4, or the third edge-detecting unit 9, a correction calculation unit 10, and the noise filter unit 8. Since the buffer unit 2, the edge-detecting unit 3, 4, or 9, for example, and the noise filter unit 8 are similar to those used in the first to third embodiments, the description of those units is omitted for simplification.

The correction calculation unit 10 includes a multiplier 101, a maximum-value and minimum-value remover 102, an average value calculator 103, and a lookup table 104. The maximum-value and minimum-value remover 102 receives from the buffer unit 2 values of peripheral pixels other than the target pixel, and removes the maximum value and the minimum value from the values of the peripheral pixels.

The average value calculator 103 calculates an average pixel value P, indicating the average of the values of the peripheral pixels other than the target pixel of image data stored in the buffer unit 2.

The lookup table 104 includes a memory. The lookup table 104 stores in advance a value calculated, such that receiving the average pixel value P causes a correction value C to be calculated using equation (2) and output:

$$C = (a \cdot P^{-1/2}) - b \qquad (2),$$

where "C" represents a correction value, "P" represents an average pixel value indicating the average of the values of the peripheral pixels other than the maximum value and the minimum value, and "a" and "b" represent constants set in advance.

The multiplier 101 multiplies the edge-detection result E, which is a digital value having a finite bit length, received from the edge-detecting unit 3, 4, or 9, for example, by the correction value C, which is a digital value having a finite bit length, and outputs the product to the noise filter unit 8.

When the edge detection result E, which is obtained by equation (1), is multiplied by the correction value C, which is obtained by equation (2), the equation $E \cdot C = (a \cdot d) - (b \cdot P^{1/2})$ is obtained. When the value "b" is sufficiently smaller than the value of "a·d", the term "$-b \cdot P^{1/2}$" can be neglected. Thus, it is noted that the dependency of shot noise on the average pixel value P can be canceled out by multiplying equation (1) by equation (2). That is, it is noted that the influence of shot noise is eliminated, and a constant standard deviation can be achieved, except for an edge area. Thus, even an area having large pixel values and thus exhibiting a large standard deviation due to the influence of shot noise is less likely to be regarded as an edge area, thus achieving appropriate noise reduction.

Figure 9:
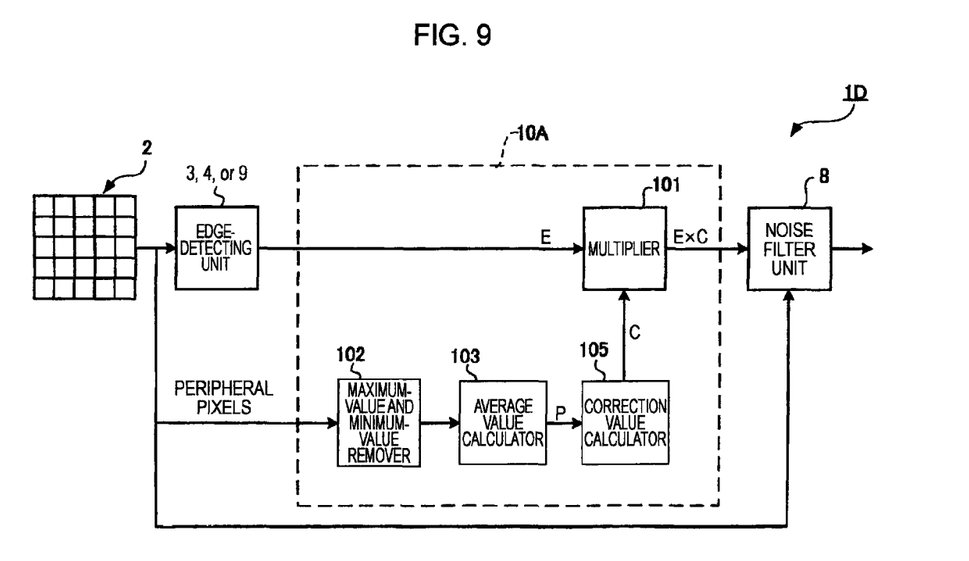
FIG. 9 is a circuit block diagram showing various features in accordance with a fifth embodiment.

FIG. 9 is a circuit block diagram of an image processing apparatus 1D showing various features in accordance with a fifth embodiment. The image processing apparatus 1D includes the buffer unit 2, the edge-detecting unit, which may be the first edge-detecting unit 3, the second edge-detecting unit 4, or the third edge-detecting unit 9, a correction calculation unit 10A, and the noise filter unit 8. Since the buffer unit 2, the edge-detecting unit 3, 4, or 9, for example, and the noise filter unit 8 are similar to those used in the first to second embodiments, the description of those units is omitted or simplified with respect to FIG. 9.

The correction calculation unit 10A includes the multiplier 101, the maximum-value and minimum-value remover 102, the average value calculator 103, and a correction value calculator 105. Since the multiplier 101, the maximum-value and minimum-value remover 102, and the average value calculator 103 are similar to those in the correction calculation unit 10 of the image processing apparatus 1C according to the fourth embodiment, the description of those units is omitted or simplified with respect to FIG. 9.

The correction value calculator 105 includes a multiplier and an adder. When receiving an average pixel value P, the correction value calculator 105 calculates and outputs a correction value C, in accordance with equation (3):

$$C = (-\alpha \cdot P) + \beta \qquad (3),$$

where "C" represents a correction value, "P" represents an average pixel value indicating the average of the values of the peripheral pixels other than the maximum value and the minimum value, and "α" and "β" represent constants set in advance.

For example, the constants "α" and "β" can be calculated using a collinear approximation obtained by a least squares method, in accordance with the relationship between the average pixel value P and the correction value C derived from equation (2) used in the fourth embodiment (for example, a digital value stored in the lookup table 104 used in the fourth embodiment).

The multiplier 101 multiplies the edge detection result E, which is a digital value having a finite bit length, received from the first edge-detecting unit 3, 4, 9, for example, by the correction value C, which is a digital value having a finite bit length, and outputs the product to the noise filter unit 8.

When the edge detection result E, which is obtained by equation (1), is multiplied by the correction value C, which is obtained by equation (3), since the correction value C is represented by a function having a negative inclination with respect to the average pixel value P, the influence of shot noise, which depends on the square root of a pixel value, is reduced. Thus, even an area having large pixel values, and thus exhibiting a large standard deviation due to the influence of shot noise, is less likely to be regarded as an edge area, thereby achieving appropriate noise reduction. In addition, since a memory forming a lookup table is not used, a smaller circuit scale can be achieved compared with the image processing apparatus 1C according to the fourth embodiment.

The above-described embodiments are not limited as described above. Various modifications and alternations can be made.

For example, although a median filter is used as a noise filter in the first and second embodiments, a spatial filter that reduces a high-frequency range of a spatial frequency may be used.

In addition, although the buffer unit 2 stores 5×5 pixels in the above-described embodiments, the buffer unit 2 may store pixels of a different size, such as 9×9 pixels.

Although the edge-detecting unit 3, 4, or 9 that receives the values of pixels of Bayer pattern image data is used in the fourth and fifth embodiments, an edge-detecting unit that receives independent RGB image data or YUV image data from an RGB single-chip sensor may be used.

In addition, the maximum-value and minimum-value remover 102 calculates an average pixel value P by removing the maximum value and the minimum value from the values of the peripheral pixels in the fourth and fifth embodiments. However, in FIGS. 8 and 9, the maximum-value and minimum-value remover 102 may be omitted. In this case, the peripheral pixels may be directly input to the average value calculator 103, and an average pixel value P may be calculated without removing the maximum value and the minimum value from the values of the peripheral pixels. Alternately, the maximum-value and minimum-value remover 102 and the average value calculator 103 may be omitted. In this case, the value of a target pixel may be used instead of the average pixel value P.

Furthermore, although a correction value C is calculated using a lookup table in the fourth embodiment, a calculation unit may be used instead of the lookup table.

For purposes of explanation, in the above description, numerous specific details are set forth in order to provide a thorough understanding of the image processing apparatus. It will be apparent, however, to one skilled in the art that the image processing apparatus can be practiced without these specific details. In other instances, well-known structures and devices are shown in block diagram form in order to avoid obscuring the image processing apparatus.

While the image processing apparatus has been described in conjunction with the specific embodiments thereof, it is evident that many alternatives, modifications, and variations will be apparent to those skilled in the art. Accordingly, embodiments of the image processing apparatus as set forth herein are intended to be illustrative, not limiting. There are changes that may be made without departing from the spirit and scope of the invention.

What is claimed is:

1. An image processing system comprising:
   a buffer unit configured to store a predetermined pixel and peripheral pixels neighboring the predetermined pixel in image data in a first direction and a second direction perpendicular to the first direction;
   a first edge-detecting circuit configured to calculate a maximum value and a minimum value of a set of pixels selected from the peripheral pixels that have the same color as the predetermined pixel to calculate a difference value between the maximum value and the minimum value;
   an average brightness value calculator configured to calculate an average brightness value for the peripheral pixels;
   an average peripheral brightness value calculator configured to select a combination of pixels having the three primary colors from among the peripheral pixels and to calculate an average peripheral brightness value for the pixels forming the combination; and
   a second edge-detecting circuit configured to calculate a sum of absolute values each obtained by subtracting the average brightness value from a corresponding average peripheral brightness value.

2. The image processing system according to claim 1, further comprising:
   a selection circuit configured to select one from a group consisting of the difference value and the total sum in accordance with a mode signal.

3. The image processing system according to claim 1, wherein the predetermined pixel is disposed at a center of the peripheral pixels in the buffer unit, and the peripheral pixels are arranged such that the number of peripheral pixels disposed in the first direction is equal to the number of peripheral pixels disposed in the second direction.

4. The image processing system according to claim 1, wherein each of the set of pixels that have the same color as the predetermined pixel are disposed in an outermost region of the peripheral pixels.

5. The image processing system according to claim 1, wherein the image data is Bayer pattern image data.

6. The image processing system according to claim 1, further comprising:
   a noise filter circuit configured to change a noise removal characteristic in accordance the difference value the sum.

7. The image processing system according to claim 1, further comprising:
   a high-pass filter configured to output a high-emphasis pixel value indicating a high-frequency component for a spatial frequency in accordance with luminance information on the predetermined pixel and the peripheral pixels; and
   a multiplier configured to multiply an output of the high-pass filter by the difference value.

8. The image processing system according to claim 1, further comprising:
   a correction calculation circuit configured to correct the difference value by canceling out noise that depends on a pixel value.

9. The image processing system according to claim 8, wherein the correction calculation circuit comprises:
   an average value calculator configured to calculate an average of pixel values of the peripheral pixels other than the maximum value and the minimum value of the peripheral pixels; and
   a memory configured to store a correction value corresponding to the average.

10. The image processing system according to claim 8, wherein the correction calculation circuit comprises:
    an average value calculator configured to calculate an average of pixel values of the peripheral pixels other than the maximum value and the minimum value of the peripheral pixels; and
    a correction value calculator configured to calculate a correction value based on the average.

11. An image processing system comprising:
    a buffer unit configured to store a predetermined pixel and peripheral pixels neighboring the predetermined pixel in image data in a first direction and a second direction perpendicular to the first direction;
    a first edge-detecting circuit configured to calculate a variance of values of a set of pixels selected from the peripheral pixels that have the same color as the predetermined pixel;
    an average brightness value calculator configured to calculate an average brightness value for the peripheral pixels;
    an average peripheral brightness value calculator configured to select a combination of pixels having the three primary colors from among the peripheral pixels and to calculate an average peripheral brightness value for the pixels forming the combination; and
    a second edge-detecting circuit configured to calculate a sum of a plurality of absolute values, each of the plurality of absolute values being obtained by subtracting the average brightness value from a corresponding average peripheral brightness value.

12. The image processing system according to claim 11, further comprising:
    a selection circuit configured to select one from a group consisting of the variance and the sum in accordance with a mode signal.

13. The image processing system according to claim 11, wherein the predetermined pixel is disposed at a center of the peripheral pixels in the buffer unit, and the peripheral pixels are arranged such that the number of peripheral pixels disposed in the first direction is equal to the number of peripheral pixels disposed in the second direction.

14. The image processing system according to claim 11, wherein the set of pixels that have the same color as the predetermined pixel are disposed in an outermost region of the peripheral pixels.

15. The image processing system according to claim 11, wherein the image data is Bayer pattern image data.

* * * * *

UNITED STATES PATENT AND TRADEMARK OFFICE
CERTIFICATE OF CORRECTION

PATENT NO. : 8,194,984 B2
APPLICATION NO. : 12/042091
DATED : June 5, 2012
INVENTOR(S) : Takeshi Seki et al.

It is certified that error appears in the above-identified patent and that said Letters Patent is hereby corrected as shown below:

Title Page --

Item (73), Assignee, delete "Fujitsu Limited, Kawasaki (JP)" and substitute therefor
-- Fujitsu Semiconductor Limited, Yokohama-shi (JP) --

Signed and Sealed this
Fourth Day of June, 2013

Teresa Stanek Rea
*Acting Director of the United States Patent and Trademark Office*